Patented Dec. 15, 1931

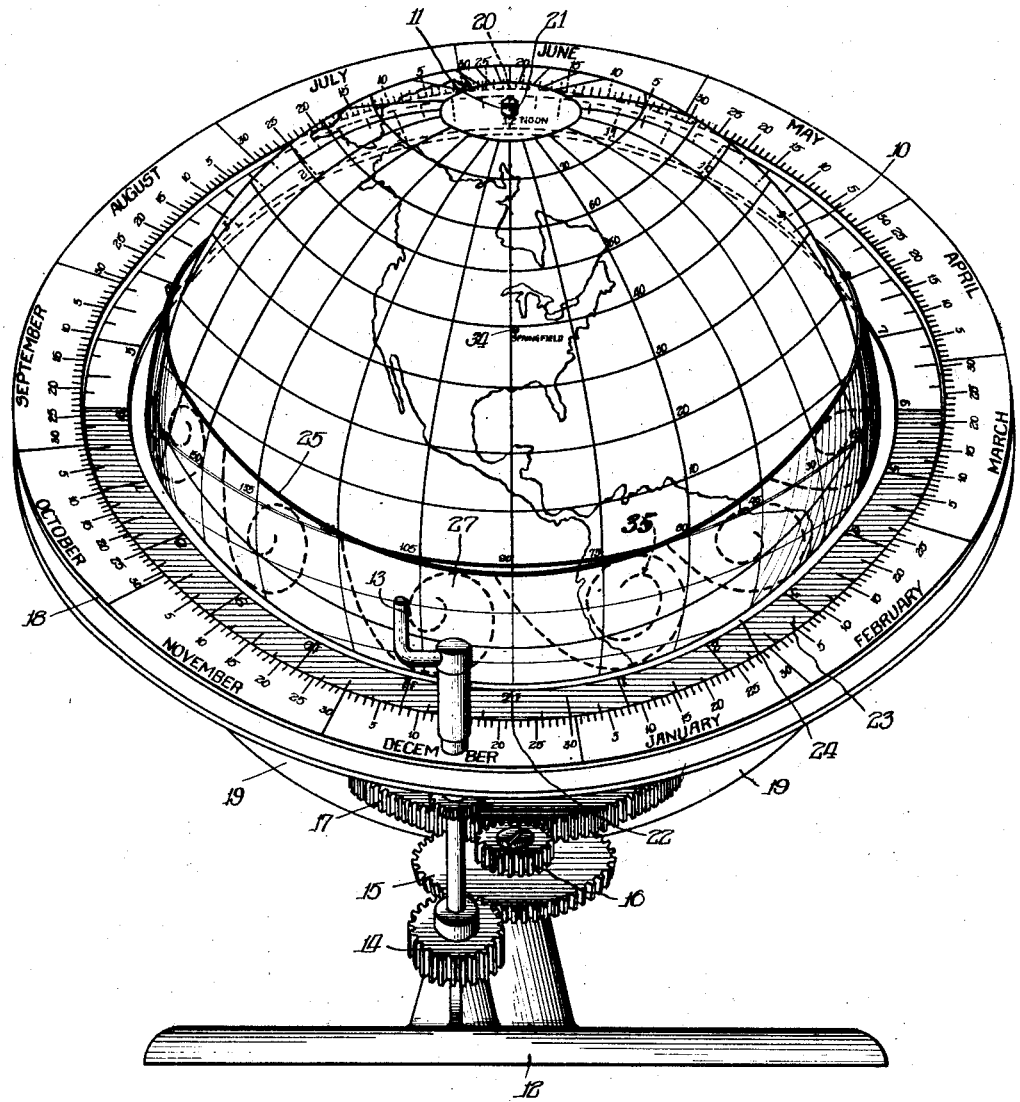

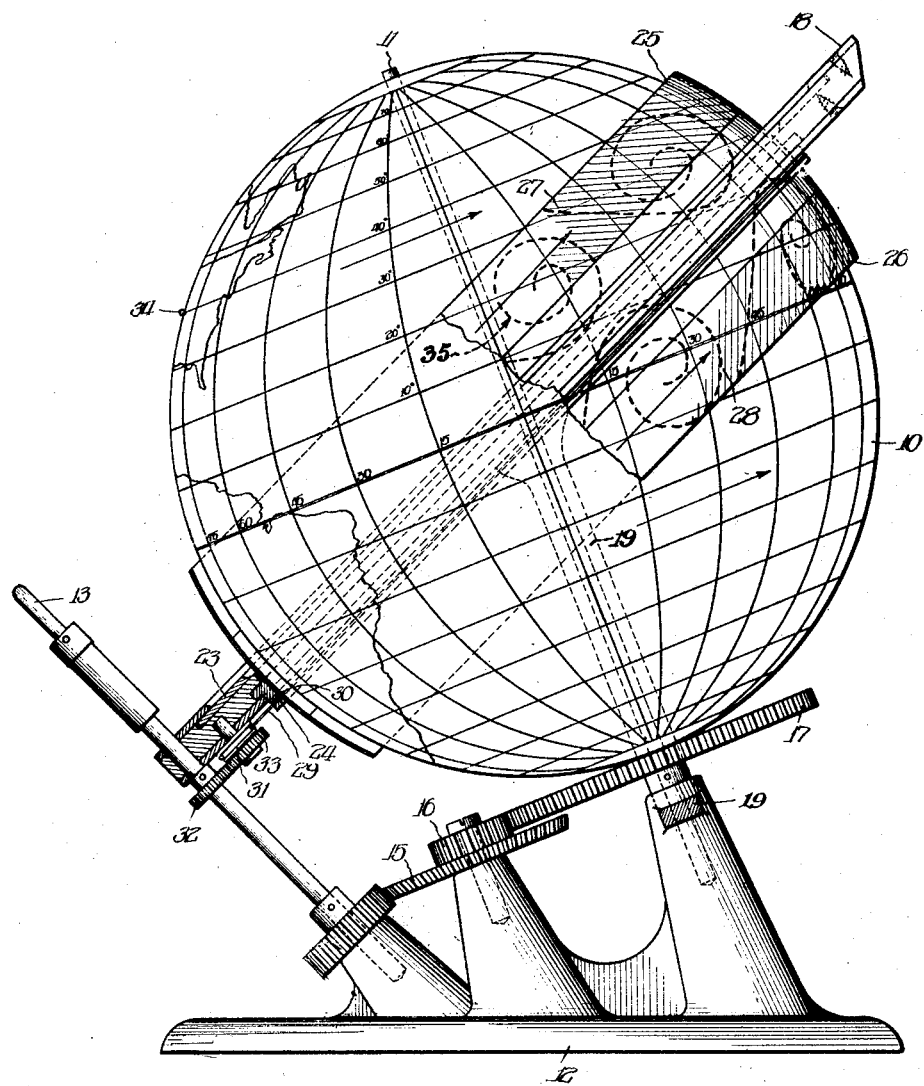

1,836,423

UNITED STATES PATENT OFFICE

PARVIN WRIGHT, OF SEATTLE, WASHINGTON

INSTRUMENT FOR LOCATING STORM ZONES

Application filed December 31, 1927. Serial No. 243,898.

The principal object of my invention is to provide an instrument by means of which a person can determine whether or not there is any likelihood of a severe atmospheric disturbance occurring in any particular locality at any given time.

Another important object of my invention is to provide an educational device for use in studying ethereal flows.

According to a theory which I have evolved, and which is supported by considerable evidence, ethereal flows exist in the higher atmosphere. The earth rotates on its axis from west to east, and these flows are believed to move eastward much faster than the earth turns, communicating movement to the air. From about 20° each side of the plane of the ecliptic—which is the constantly shifting plane through the earth's torrid zone defined by the apparent path of the sun—to about 8° each side of such plane, the ethereal flows are thrown into spiral formations or vortices which cause cyclones, tornadoes and other kinds of storms on the earth in areas of low pressure. The plane of the ecliptic shifts in the course of a year from a northernmost position 23½° north of the Equator to a southernmost position 23½° south of the Equator, and the zones in which the vortices occur—which I will call the north and south vortex zones—shift with such plane. Many points on the earth's surface do not intersect with the vortex zones at all, while other points intersect with them two, and sometimes four, times daily.

The vortices originate in the ethereal flows above the strato-sphere and normally extend but a short distance into the earth's atmosphere. During periods of low pressure, however, the vortices are likely to approach the surface of the earth and cause cyclones, tornadoes and other meteorological disturbances. If the barometer reading is high all of the agitation resulting from a vortex will pass from 10 to 20 miles overhead, while if the reading is low the agitation is likely to extend to the earth. The forward rim of each vortex turns in a direction away from the plane of the ecliptic, which movement to some extent determines the direction of the wind in certain adjacent localities.

The novel instrument hereinafter described and claimed is predicated upon the above outlined theory. The instrument is not a perfect weather prognosticator, but it is capable of pointing out the time when any particular locality, such as a city, town, flying field and the like, will cross the path of or enter into these vortex storm zones.

Heretofore aeroplane pilots engaged in long distance flights have had little to warn them of approaching danger, and not infrequently they have encountered unexpected air currents, unseen vortices, unknown eddies, silent whirlpools, and the like, which have caused them to lose control of their aeroplanes, with disastrous consequences. Unquestionably, there have been many supposedly unavoidable accidents in connection with aeroplane flights which might have been avoided had the pilots had a better understanding of atmospheric conditions.

To check the accuracy of an instrument constructed in accordance with my invention, I have made many tests in which I have set the instrument to obtain observations for the time and place of recent aeroplane and tornado disasters. The instrument shows that the city of St. Louis, Missouri was in a vortex storm zone at one o'clock P. M. September 29, 1927—which was the time that the disastrous tornado occurred at that place. While the mere knowledge of a storm's approach, or the probability of a storm, does not mitigate the resulting damages, it does allow more time for preparation. The instrument also shows that the aeroplane "Old Glory" which recently undertook a trans-Atlantic flight from west to east, was overtaken by a vortex, or a storm wind associated therewith, southeast of Newfoundland at a time shortly after the commencement of the flight. The course pursued would have brought that aeroplane into a vortex zone at a position about long. 40° W. lat. 40° N. The instrument also shows that the aeroplane "Miss Doran", which recently undertook a trans-Pacific flight, entered a vortex zone about 800 miles southwest of San Francisco before midnight on the evening of the day of its departure from Oakland, California, and that certain of the other planes engaged in the same flight entered the zone near long. 135° W. lat. 30° N.

In the accompanying drawings:

Fig. 1 is a front view of an instrument embodying the invention; and

Fig. 2 is a side view of the instrument, with portions of the same shown in section.

As will be observed in the drawings, the instrument includes a mapped globe 10 which is mounted on an axial spindle 11. The spindle is journaled in a base 12, and the globe may be rotated by turning a small hand crank 13 which is connected with the spindle by reduction gearing 14, 15, 16 and 17. A ring 18 encircles the globe at an angle of 23½° to the Equator, and represents, for certain purposes, the plane of the ecliptic. The ring 18, which I call the date ring, is stationary with respect to the base, being supported by the same on arms 19, and is divided by circumferential markings into the months and days of the year, the marking for June 22—which is the summer solstice—being the point 20 on the ring nearest the North Pole 21 on the globe, and the marking for December 22—which is the winter solstice—being the point 22 on the ring farthest from the North Pole. The construction of the arms 19 is best shown in Figure 2. The arm toward the observer is cut away, as shown by the sectioned rectangle, to clarify the view but the rear arm is shown by dotted lines extending up to join the ring 18.

The date ring 18 carries a ring 23 which I call the hour ring. The ring 23 is circumferentially shiftable with respect to the ring 18 and is divided by circumferentially spaced markings into the hours of the day and night, the marking on the ring which indicates 12 o'clock noon being conspicuously designated as such, and the portion of the ring which extends from the marking for 6 o'clock P. M. to that for 6 o'clock A. M. being shaded to indicate night. The ring 23 may be shifted by hand into any desired position, and the friction of the ring 23 against the ring 18 is sufficient to hold the ring 23 against inadvertent movement while in any position.

The date ring 18 also carries a ring 24 which forms a central support for two oppositely extending bands 25 and 26 which are made of some transparent material. The bands 25 and 26 curve about the globe in slightly spaced relation to the surface of the same, and are marked with zones 27 and 28 which extend parallel with the plane of the ecliptic and represent respectively the north and south vortex zones. The zones begin about 20° each side of the plane and extend inwardly to about 8° each side of the same, the edges of the zones being defined on the bands by parallel lines. The ring 24 which supports the zone bands is journaled in the ring 18 and is caused, when the globe is rotated, to rotate in the same direction at from two to three times the speed of the globe, the movement being imparted to the ring 24 by a belt 29 which fits into a groove 30 in the ring and passes over a pulley 31 which is rotated by the crank 13 through gearing 32 and 33. The movement of the ring 24 and the portions of the bands 25 and 26 inwardly of the vortex zones represents the movement of the ethereal flows about the earth, while the zones represent the limits within which the vortices in the ethereal flows will occur. The vortices themselves may be represented to good advantage, when the instrument is to be used for educational purposes, by small wire spirals 35 carried by the ring 24 and converging toward the surface of the globe within the areas defined by the zones.

The instrument, in being used to ascertain the liklihood of a severe atmospheric disturbance at a given time and place, is manipulated in the following manner:

The hour ring 23 is shifted relative to the date ring 18 until the mark on the hour ring designating 12 o'clock noon is in register with the mark on the date ring designating the particular date and month under consideration. The location on the globe of the particular city, town, flying field, or other point under consideration, is then carefully noted, and the crank is turned in such a way as to cause that point on the globe to move from west to east. When that point intersects with either the north or south vortex zone, as the case may be, the crank is brought to rest and the particular meridian of longitude on which the point appears is traced down to the hour ring. The marking on the hour ring in register with that meridian is the hour of the day or night when the point under consideration will enter the zone. By turning the hand crank still farther, the hour when the point will move out of the zone may also be ascertained. Between those hours severe atmospheric disturbances are quite likely to occur if the barometric pressure happens to be low, but for all other hours, unless the point under consideration passes through the other vortex zone, there should be no severe atmospheric disturbances regardless of the extent to which the barometric pressure drops.

For example, in taking the reading for

Springfield, Illinois, on the 22nd day of June, the 12 o'clock noon marking on the hour ring is shifted into register with the 22nd day of June marking on the date ring (see Fig. 1) and, for convenience in keeping Springfield located on the globe, a short headed pin 34 is pushed into the material of the globe at the proper point, which is approximately long. 90° W. lat. 40° N. The globe is then rotated, and the position of the 90° W. meridian of longitude near which Springfield is located is noted with respect to the markings on the hour circle, both when Springfield enters the north vortex zone—which is found to be at 9 o'clock in the morning, and when it leaves that zone—which is found to be at 3 o'clock in the afternoon.

It is not necessary to actually rotate the globe in order to find out when Springfield, for instance, enters and leaves the north vortex zone, because the 40° N. parallel of latitude near which Springfield is located can be traced around the globe (see Fig. 2), and the meridians of longitude intersecting with the 40° N. parallel of latitude at the points of entry and departure may be traced down to the hour ring and the same readings obtained.

Between the vortex zones 25 and 26, shifting along midway between the Equator and the ecliptic, we should expect violent hurricanic winds from the westward when the barometer is low. North of the north vortex zone there should be strong winds from the northwest and south of the south vortex zone there should be strong winds from the southwest, especially in the higher atmosphere, converging near the Equator.

All of these winds, as well as the vortices, are caused directly by the great velocity of the earth in its orbit—nearly 19 miles per second—moving through the solar ethereal atmosphere of varying density. The resistance to this movement supplies force for the tornado and cyclone and it gives a general west to east movement to the prevailing winds, and, through the atmosphere, to the earth itself.

On the globe shown in the drawings, the meridians of longitude appear only at 15° intervals and the parallels of latitude appear only at 10° intervals, but, in practice, the meridians and parallels appearing on the globe should not be at more than 5° intervals.

I claim:

1. In a device of the character described, a mapped globe mounted for rotation on its polar axis, and means mounted for rotation about the globe at from two to three times the speed of rotation of the latter on an axis set 23½° to such polar axis for simulating in the locality of the plane of the ecliptic the movement of ethereal flows and for indicating limiting zones for vortices occurring in such flows.

2. In a device of the character described, a mapped globe mounted for rotation on its polar axis, a date ring encircling the globe in substantially the plane of the ecliptic, an hour ring associated with the date ring in circumferentially adjustable relation to the same, and means for defining zones about the globe parallel to and on opposite sides of the ecliptic.

In testimony whereof I have hereunto subscribed my name.

PARVIN WRIGHT.